United States Patent [19]
Pollitt

[11] 3,765,276
[45] Oct. 16, 1973

[54] WIRE STRIPPER DEVICE
[75] Inventor: Joseph F. Pollitt, Haverhill, Mass.
[73] Assignee: Western Electric Company, Incorporated, New York, N.Y.
[22] Filed: Mar. 24, 1972
[21] Appl. No.: 237,668

[52] U.S. Cl. .................................. 81/9.51, 219/221
[51] Int. Cl. ............................................. H02g 1/12
[58] Field of Search .............. 81/9.51, 9.5 R, 9.5 A; 219/221, 230

[56] References Cited
UNITED STATES PATENTS
| | | | |
|---|---|---|---|
| 2,768,276 | 10/1956 | Arntzen | 81/9.5 R |
| 3,199,383 | 8/1965 | Gudmestad | 81/9.51 |
| 3,343,433 | 9/1967 | Rozmus | 81/9.5 B |

*Primary Examiner*—Donald G. Kelly
*Assistant Examiner*—Roscoe V. Parker
*Attorney*—W. M. Kain et al.

[57] ABSTRACT

A wire stripper device includes members for clamping an insulated wire, distinct but cooperating members for thermally severing and for stripping the insulation on the wire and members for cutting the wire. Initially, one end of an insulated wire is positioned in the wire stripper device so that the wire end abuts an adjustable stop. The clamping members are then operated automatically to clamp the insulated wire in position. At the same time, the thermal severing members are moved to a position proximate to the periphery of the insulated wire and the stripping members are moved into gripping engagement with the insulated wire. The thermal severing members then heat the insulation for a predetermined time interval sufficient to sever the insulation.

Upon the elapse of the time interval, the stripping members are automatically moved along the wire to strip the severed insulation from the wire. A preset extent of movement of the stripping members actuates the cutting members for severing the wire, thus providing a bare end section of predetermined length. Normally, the cooperation between the stripping members and the thermal severing members prevents the thermal severing members from engaging the wire. In the event the thermal severing members are permitted to engage the wire, the cooperation between the stripping members and the thermal severing members decreases the force exerted by the thermal severing members against the wire and thereby prevents damage to the wire and the thermal severing members.

15 Claims, 7 Drawing Figures

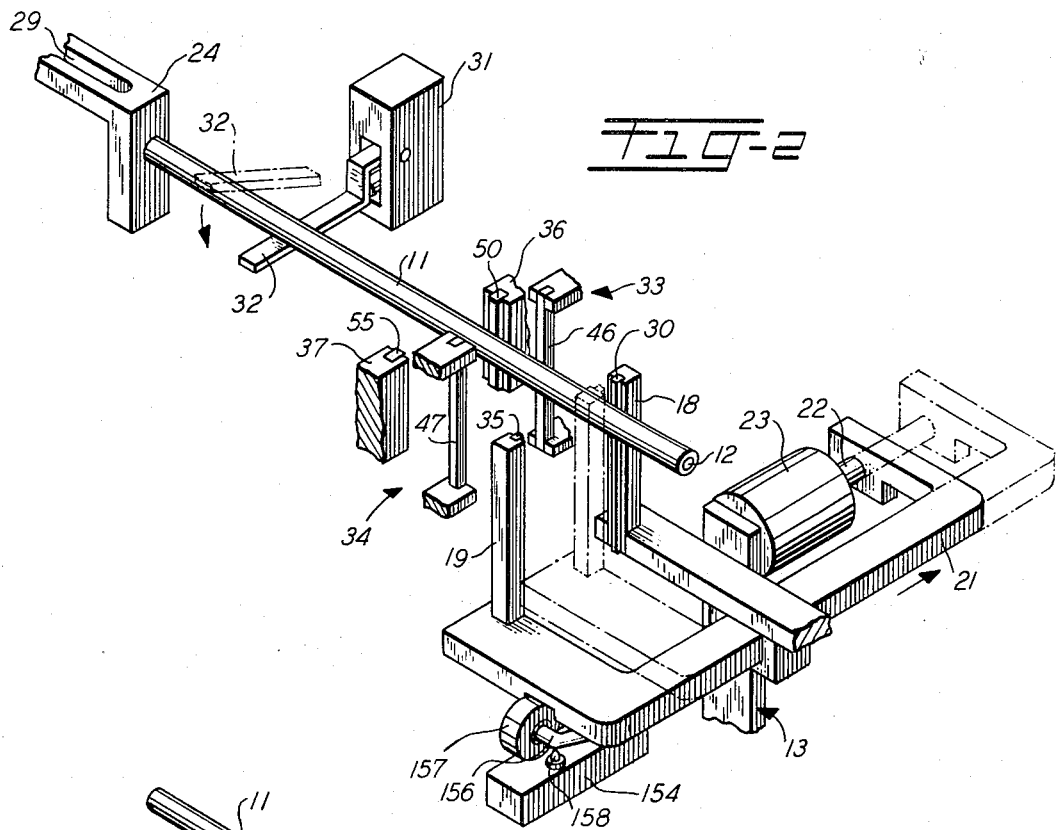
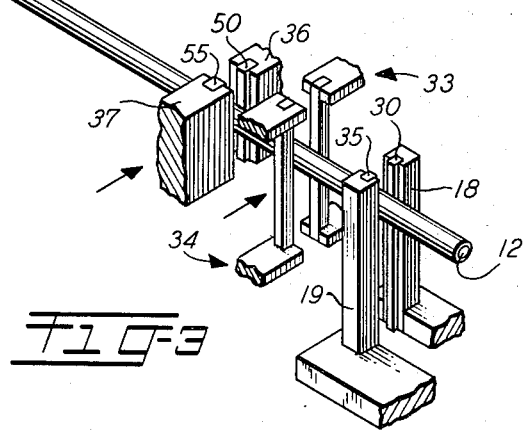

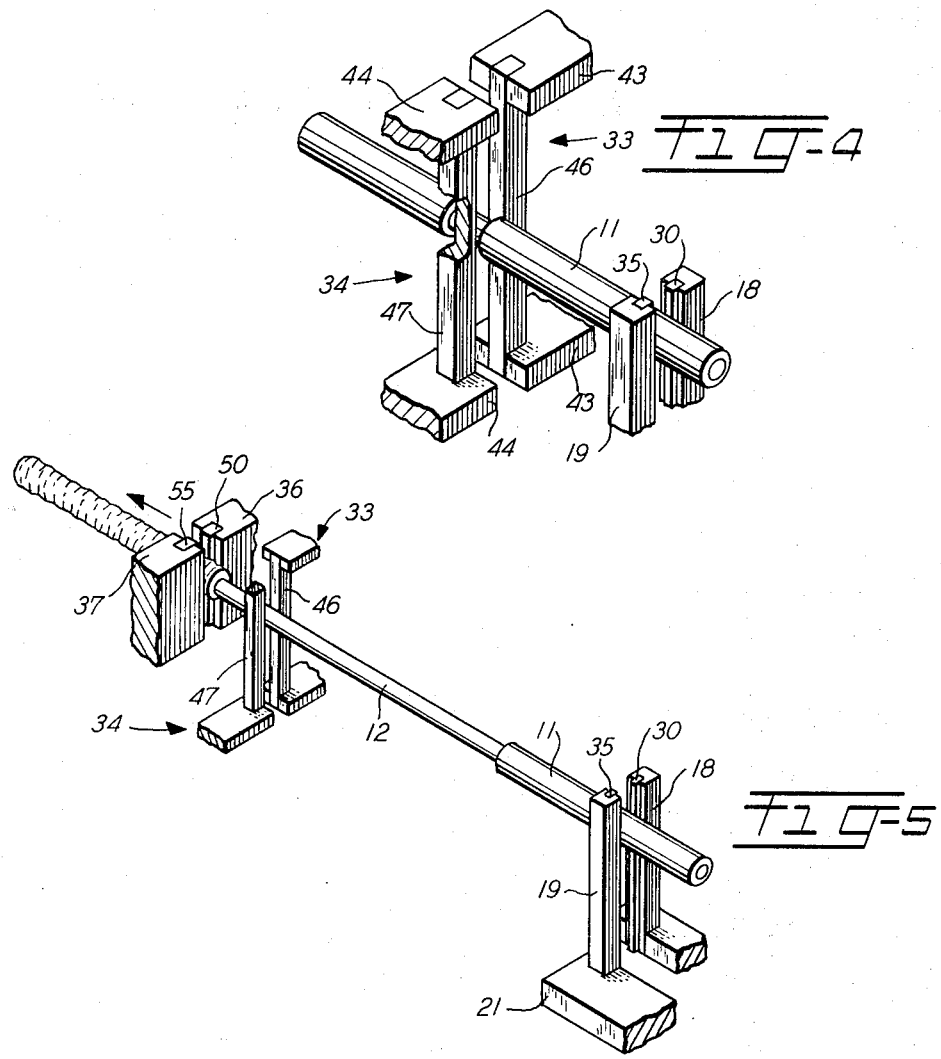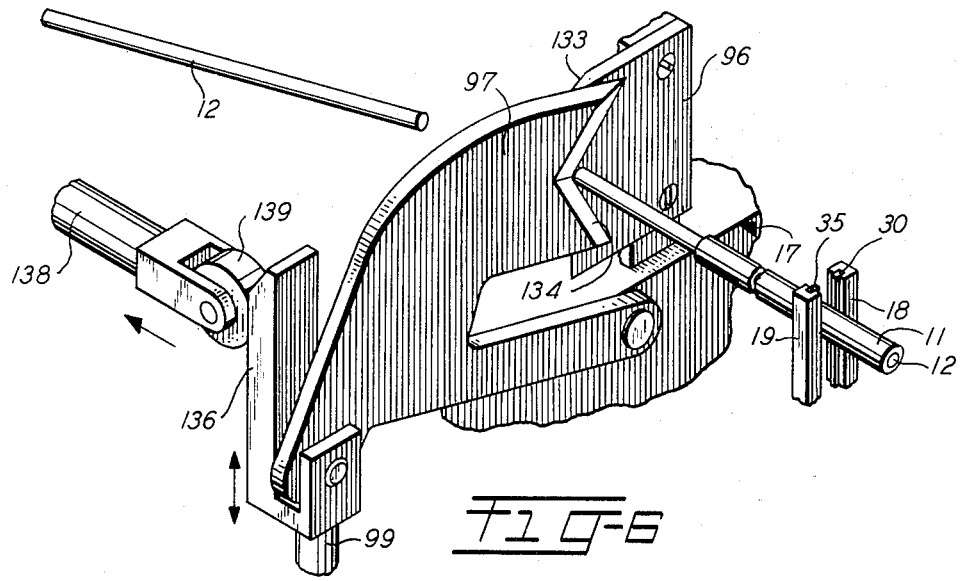

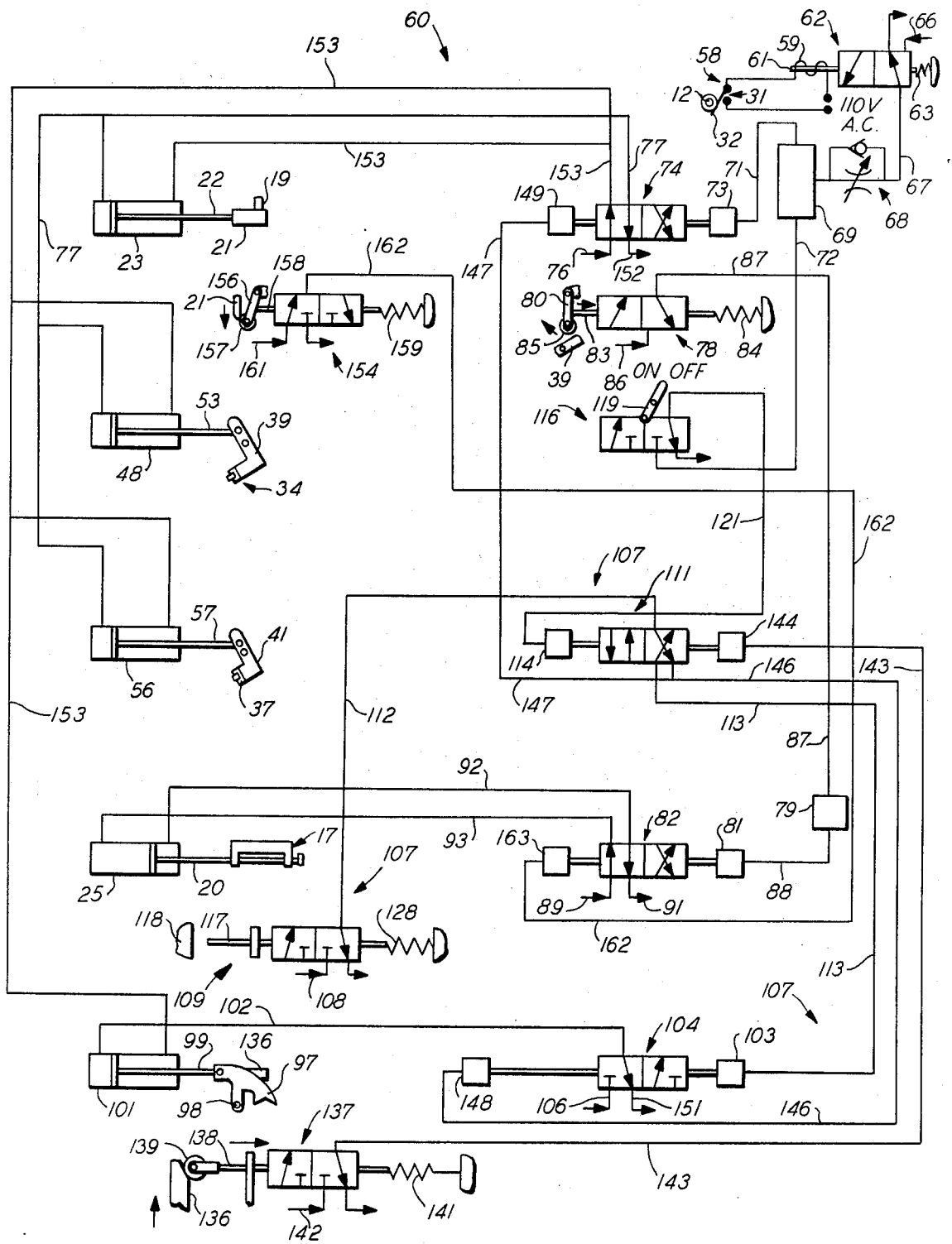

WIRE STRIPPER DEVICE

BACKGROUND OF THE INVENTION

1. Field of the Invention

This invention relates to wire stripper devices and, more specifically, to a wire stripper device utilizing distinct thermal severing members and insulation stripping members and having facilities for preventing the wire and the severing members from being subjected to harmful stresses during the operation of the device.

2. Description of the Prior Art

The manufacture and repair of electrical equipment, particularly in the field of telephony, often requires numerous wire conductors. Where insulated wire is used, a length of insulation must usually be stripped from the end of the wire to provide a bare wire end for terminating the wire.

An important consideration in the design of any wire stripper device is the ability to strip the insulation from the underlying wire without bending, nicking, scoring, or otherwise damaging the wire. If the wire is bent, scored, or nicked, it may be broken in a subsequent handling or securing operation. For example, where the wire is secured to a terminal by a wire wrapping operation, considerable tension is applied to the wire, and unless stress concentrations due to nicks or scrapes are avoided, the wire may break. Also, surface damage may create stress concentrations which make the wire susceptible to fatigue failure, particularly if the equipment in which it is used is subjected to vibrations. Additionally, surface damage may alter the electrical characteristics of the wire.

Another important design consideration is the adaptability of the wire stripping device to wires of different thicknesses, since the wiring of even a single electrical component may require different gauges of wire. For efficiency in the wire stripping operation, a wire stripper device should be readily adaptable to different gauge wires without nicking, scraping or otherwise damaging the wire.

Still another factor relevant to the design of a wire stripper device is the possibility that connections to various types of terminals or components may require insulated wires having bare end sections of varying lengths. For this reason, a wire stripper device should be readily adaptable for providing insulated conductors having bare end sections of precise, predetermined lengths.

Of the diverse types of wire stripper devices that have been designed, many utilize sharp cutting elements to sever the insulation or to both sever the insulation and strip the severed insulation from the wire. Where the operation of these sharp, rigid cutting elements is not adaptable to different thicknesses of wire, the wire may be damaged during either the severing or the stripping operation. In addition, the cutting elements may require frequent sharpening or replacement.

The use of thermal wire strippers, that is, wire strippers utilizing heating elements instead of cutting elements, obviates several of the problems presented by mechanical cutting elements. For example, the absence of a sharp cutting element lessens the danger of scoring or nicking the wire. Also, the heating elements need not be rigid; that is, they may be in the form of resilient strips of metal or wire. The use of such resilient heating elements enhances the adaptability of the device to different sizes of wire.

Unfortunately, where the heating elements are used to both sever and strip the insulation, strength requirements may necessitate using heating elements which are too large for controlled localized heating. Conversely, where the heating elements are sufficiently small to provide localized heating, they may not sever the insulation cleanly. In this latter case, even if the small, relatively fragile heating elements are not used to perform the stripping operation, and merely remain in contact with the insulation during the stripping of the insulation, they may be damaged by pulling stresses caused by the stripping.

It may be thus appreciated that there exists a need for a thermal wire stripper device, utilizing separate heating and stripping elements, which is capable of removing insulation from various thicknesses of insulated wire to provide bare end sections of precise, predetermined lengths without incurring damage either to the wire or to the heating elements of the device itself.

SUMMARY OF THE INVENTION

It is an object of this invention to provide a new and improved wire stripping device which is capable of first severing the insulation at a point near an end of an insulated wire and then stripping the severed insulation from the end of the wire.

In view of the aforementioned need for a device which is capable of stripping the insulation from wires of various thicknesses without damaging the wire or the device itself, it is an additional object of this invention to provide a wire stripper device utilizing heating means for severing the insulation on an insulated wire, and separate insulation stripping means which cooperate with the heating to prevent forceable engagement between the heating means and the insulated wire.

It is yet another object of this invention to provide a wire stripper device which severs and strips a predetermined length of insulation from one end of an insulated wire, and which can then cut the resulting bare end of the insulated wire to a predetermined length.

A thermal wire stripper device illustrating certain principles of the invention may include a frame and means for positioning an insulated wire on the frame for a wire stripping operation. Other, distinct means mounted on the frame are actuated to sequentially sever and strip the insulation and, then, sever the wire at a point along the stripped section thereof to insure the production of uniform lengths of bare end sections.

DESCRIPTION OF THE DRAWINGS

FIGS. 2 through 6 are partial isometric views of the wire stripper device of FIG. 1, showing the arrangement of and cooperation among various elements of the wire stripper device; and FIG. 7 is a diagram showing a combined electrical and pneumatic system for controlling the operation of the wire stripper device.

DETAILED DESCRIPTION

Figure 1:
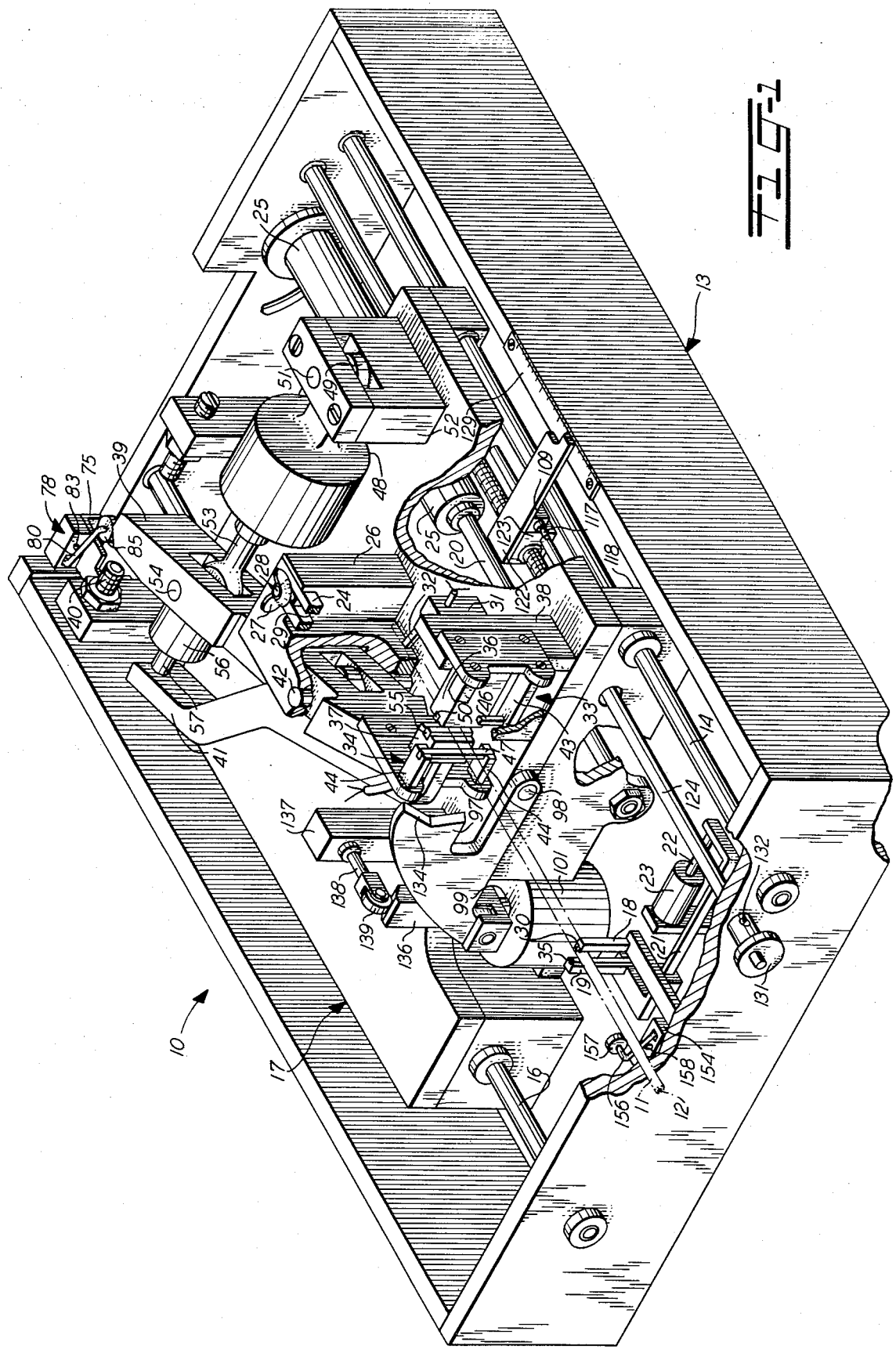
FIG. 1 is an isometric view, partially cut away, of a wire stripper device embodying the principles of the present invention.

Referring to FIG. 1, there is shown one embodiment of a wire stripper device, designated generally by the numeral 10, constructed in accordance with the principles of the present invention for severing and stripping a length of insulation 11 from a wire 12. The wire stripper device 10 includes a stationary frame (top removed for viewing), designated generally by the numeral 13, which supports a pair of spaced, parallel guide rods 14 and 16. The guide rods 14 and 16, in turn, slidably support a carrier, designated generally by the numeral 17. A piston rod 20 extending from an air cylinder 25, which is mounted fixedly to the rear of the frame 13, is connected to the carrier 17 for slidably moving the carrier along the guide rods 14 and 16.

Referring also to FIG. 2, there is shown a pair of wire clamping jaws 18 and 19. The wire clamping jaws 18 and 19 have rubber inserts 30 and 35, respectively, which permit the jaws to securely grip the wire 12 without damaging the wire. The wire clamping jaw 18 is mounted in a stationary position on the frame 13. A slide 21 carried by the frame 13 mounts the wire clamping jaw 19 for movement relative to the wire clamping jaw 18. A piston rod 22 extending from an air cylinder 23, which is mounted fixedly to the frame 13, is connected to the slide 21 for imparting movement to the slide and to the clamping jaw 19 when air is admitted to the cylinder.

Referring further to FIGS. 1 and 2, the length of insulated wire 12 which can be inserted between the normally open wire clamping jaws 18 and 19 into the wire stripping device 10 (FIG. 1) and, thus, the length of insulation 11 which can be stripped from the wire, is determined by an adjustable, L-shaped, wire stop 24 (shown partially cut away in both FIGS. 1 and 2). The wire stop 24 is positioned along a projecting section 26 (FIG. 1) of the carrier 17 (FIG. 1) and is secured adjustably by a wing-nut 27 (FIG. 1) to a screw 28 (FIG. 1) extending from the projecting section and through a slot 29 formed in the wire stop.

Referring still further to FIGS. 1 and 2, there is shown a switch 31 which is mounted on the carrier 17 (FIG. 1) adjacent to the position whereat a forward end of the wire 12 is positioned in engagement with the wire stop 24 and which initiates the operation of the wire stripper device 10 (FIG. 1). An actuator lever 32 for the switch 31 extends from the switch transverse to the forward end of the wire 12. The actuator lever 32 is normally biased upwardly.

Referring further to FIG. 2, to secure an insulated wire 12 in position in the wire stripper device 10 (FIG. 1) an operator inserts the wire into the device between the open clamping jaws 18 and 19 until the forward end of the wire abuts the adjustable wire stop 24. The wire 12 is then moved downwardly so that a trailing portion thereof is moved between the clamping jaws 18 and 19 and the forward portion thereof depresses the actuator lever 32, thus closing the switch 31 to control the admission of air to the air cylinder 23. The air cylinder 23 then advances the piston rod 22 to the right, moving the slide 21 to thereby move the clamping jaw 19 toward the clamping jaw 18 to firmly grip the insulated wire 12 in position for an insulation severing and stripping and wire severing operation. The operation of the switch 31 also initiates the insulation severing and stripping and wire severing operation, as is hereinafter described.

Referring again to FIG. 1, there is shown a pair of insulation heater jaws, designated generally by the numerals 33 and 34, and a pair of insulation stripper jaws 36 and 37. In the embodiment shown in FIG. 1, the heater jaw 33 and the stripper jaw 36 are fixed to a bracket assembly 38 which is secured fixedly to the carrier 17. A heater lever 39 and a stripper lever 41 are pivotally mounted, intermediate to ends thereof, on a stud 42 extending between the carrier 17 and the projecting section 26 of the carrier. The heater jaw 34 is mounted to a first end of the heater lever 39 for pivotal movement toward the heater jaw 33. An adjustable stop 40 which is mounted to the carrier 17 limits the pivotal movement of the heater lever 39 to prevent the heater jaws 33 and 34 from accidentally touching when there is no wire positioned therebetween. The stripper jaw 37 is mounted to a first end of the stripper lever 41 for pivotal movement toward the stripper jaw 36. The heater jaws 33 and 34 are comprised of pairs of insulative arms 43—43 and 44—44 respectively, and also a pair of heating elements 46 and 47, respectively, which are mounted on the insulative arms and which cooperate in severing the insulation 11 on the wire 12.

Pivotal movement of the heater lever 39 and, thus, the operation of the cooperating heater jaw 33 and 34, is controlled by an air cylinder 48. Extending from one end of the air cylinder 48 is a link 49 which is pivotally connected to a stud 51 secured by a bracket assembly 52 to the carrier 17. Extending from the opposite end of the air cylinder 48 is a piston rod 53 which is pivotally connected to a stud 54 secured near a second end, opposite the first end, of the heater lever 39. When air is admitted to the air cylinder 48, the piston rod 53 is advanced to pivot the heater lever 39. Pivotal movement of the heater lever 39 moves the heater jaw 34 toward the cooperating heater jaw 33, as shown in FIG. 3.

Referring again to FIG. 1, there is shown an air cylinder 56 which has a piston rod 57 extending from one end thereof and which is pivotally mounted at the opposite end thereof to the outer side of the second end of the heater lever 39 by the stud 54. This mounting arrangement is chosen to permit the air cylinder 56 both to effect the closure of the stripper jaws 36 and 37 about the insulated wire 12 and also to oppose the pivotal movement of the heater lever 39 to prevent the heater jaws 33 and 34 from forceably engaging the insulated wire.

Thus, when air is admitted to the air cylinder 56, the piston rod 57 is advanced to the left in FIG. 1 and engages the inner side of the second end of the stripper lever 41, thereafter pivoting the first end of the stripper lever and the stripper jaw 37 toward the stripper jaw 36 to engage the wire 12, as shown in FIG. 3. As is shown in FIGS. 1–3 and 5, the stripper jaws 36 and 37 have rubber inserts 50 and 55 which prevent damage to the insulated wire 12. The direction of the force applied by the advancing piston rod 57 against the stripper lever 41, in bringing the stripper 37 and thereby the stripper jaw 36 into engagement with the insulated wire 12, is such that there is a reactive force which urges the air cylinder 56 to the right, as viewed in FIG. 1. This reactive force is applied to the stud 54 and is opposed by the force which is exerted against the stud by the piston rod 53 in pivoting the heater lever 39 to move the heater jaw 34 toward the heater jaw 33.

As will be more fully described hereinafter, the air which operates the air cylinders 48 and 56 is supplied to the two cylinders simultaneously. Regulators (not shown) are provided for controlling the gauge pressure attained by the air cylinders 48 and 56. More particularly, the regulators may be preset so that air cylinder 56 attains a higher gauge pressure than air cylinder 48.

As shown in FIG. 1, air cylinder 48 is considerably larger than air cylinder 56. Because of the difference in the size of the air cylinders 48 and 56 and despite the higher pressure setting for the air cylinder 56 and the simultaneous application of air to the cylinders, the air cylinder 56 reaches operating pressure and advances the piston rod 57 before piston rod 53 is advanced by the air cylinder 48. The advancing piston rod 57 pivots the stripper lever 41, bringing the stripper jaws 36 and 37 into engagement with the insulated wire 12 and applying the resulting reactive force to the air cylinder 56 and against the stud 54 and the heater lever 39. When the air cylinder 48 reaches operating pressure, the piston rod 53 is advanced against the reactive force exerted by the air cylinder 56, pivoting the heater lever 39 to the left in FIG. 1 and also pivoting the stripper lever 41 to the left to place the stripper jaws 36 and 37 into gripping engagement with the insulated wire 12.

By presetting the gauge pressure of the air cylinder 56 to a sufficiently high value relative to that for the air cylinder 48, the opposing forces applied to the stud 54 and the heater lever 39 by the air cylinder 56 and the piston rod 53 reach equilibrium, and the pivotal movement of the heater lever is terminated, at a point such that the heater jaws 33 and 34 are positioned proximate to, but not in forceable engagement with, the periphery of the insulated wire 12. Thus, damage to the insulated wire 12 and the heating elements 46 and 47, which could result from forceable engagement therebetween, is prevented. Also, when the insulation 11 is stripped from the wire 12, the insulation pulling force will be on the stripper jaws 36 and 37, rather than on the relatively fragile heating elements 46 and 47.

Referring now to FIG. 7, there is illustrated a combined electrical and pneumatic system, designated generally by the reference numeral 60, for controlling the operation of the wire stripper device 10 (FIG. 1). As mentioned previously, after the insulated wire 12 is positioned against the adjustable wire stop 24 (FIG. 2), the wire is moved downwardly against the actuator lever 32, pivoting the lever downwardly to close the switch 31. The closure of the switch 31 initiates the operation of a solenoid, which is designated generally by the reference numeral 58. That is, the closure of the switch 31 applies an operating potential to a coil 59 of the solenoid 58 and an associated plunger 61 is then moved to the right to move an air valve 62 to the right against the biasing action of a compression spring 63. The rightward movement of the air valve 62 sets the air valve to connect a pressure feed line 66 to an air line 67. The input from the pressure feed line 66 is then applied by the air line 67 to an adjustable pneumatic time delay, which is designated generally by the reference number 68, and is applied through the time delay to an impulse valve 69. The impulse valve 69 applies a single pulse of air over each of two output lines 71 and 72.

The output line 71 applies its air pulse to a pilot valve 73 to move an air valve 74 to the left, thereby connecting a pressure feed line 76 to an air line 77. The air line 77 applies the input from the pressure feed line 76 to the air cylinder 23, moving the slide 21 to the right, as shown also in FIG. 2, to close the wire clamping jaws 18 and 19 about the trailing portion of the insulated wire 12 and thereby secure the wire in position for an insulation severing and stripping and wire severing operation. The air line 77 also applies air to the cylinders 48 and 56, moving the heater lever 39 to position the heater jaws 33 and 34 adjacent to the insulated wire 12, and moving the stripper lever 41 to close the stripper jaws 36 and 37 about the insulated wire 12, as shown in FIG. 3.

The pneumatic time delay 68 permits several insulated wires 12 to be inserted into the wire stripper device 10. The positioning of the first insulated wire 12 depresses the lever 32 to operate the switch 31 and initiate the closing of the various pairs of jaws, as discussed previously. However, the pneumatic time delay 68 provides a time interval between the operation of the switch 31 and the closing of the various jaws which is sufficient to allow additional insulated wires 12 to be stacked onto the first wire.

A power supply (not shown) is used to continuously supply current to the heating elements 46 and 47 (FIG. 1) to maintain the heating elements at an elevated temperature. Thus, when the insulation heater jaws 33 and 34 are closed about the wire 12, the heating elements 46 and 47 commence the thermal severing of the insulation 11, as shown in FIG. 4.

Referring again to FIG. 7, there is shown an air valve 78 which is controlled by a plunger 83 and is connected through a pneumatic time delay 79 to a pivot valve 81. The pivot valve 81 controls the operation of an air valve 82 which in turn, controls the operation of the air cylinder 25 associated with the carrier 17.

Referring now to FIG. 1, the air valve 78 is mounted on a bracket 75 which is affixed to the rear of the carrier 17. The plunger 83 extends from the air valve 78, being biased outwardly therefrom by a compression spring 84 (FIG. 7). A lever 80 is pivotally mounted at one end to the air valve 78 and carries a cam follower 85 at the other end. The lever 80 and cam follower 85 are normally held away from the air valve 78 by the spring biased plunger 83.

When the heater lever 39 is pivoted by the piston rod 53 to move the heater jaw 34 toward the heater jaw 33, the second end of the heater lever engages the cam follower 85 and thereafter pivots the cam follower and the lever 80 toward the air valve 78. The pivoting lever 80 overcomes the biasing action of the compression spring 84 and depresses the plunger 83, shifting the air valve to the right, as viewed in FIG. 7. In this rightward position, the air valve 78 connects a pressure feed line 86 to an air line 87 to pass an air input to the pneumatic time delay 79.

Referring further to FIG. 7, after a predetermined time delay sufficient to allow the heating elements 46 and 47 to effect the severing of the insulation 11, the pneumatic time delay 79 applies the air input over an air line 88 to actuate the pilot valve 81. The pilot valve 81 then moves the air valve 82 to the left to connect a pressure feed line 89 and an exhaust line 91 to a pair of air lines 92 and 93, respectively, which connect to forward and rear portions of the air cylinder 25. The air line 93 exhausts the air from the rear of the air cylinder 25 and the air line 92 admits air to the forward portion of the air cylinder, thus retracting the piston rod 20. In retracting, the piston rod 20 moves the carrier 17 and the closed stripper jaws 36 and 37 away from the stationary clamping jaws 18 and 19, as shown in FIG. 5, to strip the severed insulation 11 from the wire 12.

Referring now to FIG. 1, a pair of wire cutter jaws 96 and 97 are mounted on the carrier 17 adjacent to the heater jaws 33 and 34 (wire cutter jaw 96 is omitted in FIG. 1 for clarity, but is visible in FIG. 6). Wire cutter jaw 96 is fixed to the carrier 17. Wire cutter jaw 97 is mounted for pivotal movement toward and away from the wire cutter jaw 96 by a stud 98 which is fixed to the carrier 17. The pivotal movement of the wire cutter jaw 97 toward and away from the wire cutter jaw 96, that is, the closing and opening of the wire cutter jaw 97, is controlled by a piston rod 99 extending from an air cylinder 101 which is mounted to the carrier 17.

Referring now to FIG. 7, the piston rod 99 is advanced and the wire cutter jaw 97 is pivotally closed by the application of pressurized air through an air line 102 to the rear of the air cylinder 101. A cutter actuator pilot valve 103 is utilized to move a cutter actuator valve 104 to the left to connect a pressure feed line 106 to the air line 102, thereby supplying the requisite air input to the air cylinder 101. The cutter actuator pilot valve 103 is operated by air applied over a circuit, designated generally by the numeral 107, which includes a pressure feed line 108, air valves 109 and 111 and air lines 112 and 113.

To complete the circuit 107 and effect the operation of the cutter actuator pilot valve 103 and the closure of the wire cutter jaw 97, the air valves 109 and 111 must be shifted to the right, as viewed in FIG. 7, to place the air line 112 in communication with the pressure feed line 108 and the air line 113. The rightward movement of the air valve 111 is effected by a pilot valve 114, which is controlled by a cutter control valve 116. The rightward movement of the air valve 109 is effected by a plunger 117, which is depressed by a front support plate 118 of the carrier 17 (FIG. 1).

To examine the completion of the circuit 107 in detail, consider first the rightward positioning of the air valve 111. A cutter control lever 119 is used to manually preset the cutter control valve 116 to either allow or to preclude the operation of the pilot valve 114. With the cutter control lever 119 in an "on" position, the single pulse of air which is transported over the air line 72 from the impulse valve 69 is applied through the cutter control valve 116 and over an air line 121 to operate the pilot valve 114. The pilot valve 114 then moves the air valve 111 to the right to connect the air line 112 to the air line 113. Conversely, with the cutter control lever 119 preset in an "off" position, the cutter control valve 116 blocks the impulse from the impulse valve 69, preventing the rightward movement of the air valve 111 and the connection between the air lines 112 and 113 and thereby precluding the closure of the wire cutter jaw 97.

Referring now to FIG. 1, the air valve 109 and an indicator slide 122 are mounted on a stop block 123. The stop block 123 is carried by a guide rod 124 which is mounted to the frame 13 below, and parallel to the length of, the carrier 17. The plunger 117 is biased outwardly from the air valve 109 by a compression spring 128 (FIG. 7) and extends toward the front support plate 118 of the carrier 17.

Referring further to FIG. 1, as the carrier 17 is withdrawn by the piston rod 20 to move the closed wire stripper jaws 36 and 37 along the wire 12 to strip the insulation 11 from the wire (FIG. 5), the front support plate 118 of the carrier 17 engages the stop block 123, thereby stopping the withdrawal of the carrier. Immediately preceding the engagement between the front support plate 118 and the stop block 123, the front support plate engages and depresses the plunger 117, thereby moving the air valve 109 to the right against the biasing action of the compression spring 128, as shown in FIG. 7. The rightward movement of the air valve 109 connects the pressure feed line 108 to the air line 112. Assuming that the cutter control lever 119 has been set in the "on" position to position the air valve 111 to the right, the input from the pressure feed line 108 is then applied over the completed circuit 107 to operate the cutter actuator pilot valve 103.

As previously mentioned, the operation of the cutter actuator pilot valve 103 moves the air valve 104 to the left, thereby applying the input from the pressure feed line 106 through the air line 102 to the rear of the air cylinder 101 to advance the piston rod 99. The advancing piston rod 99 pivotally closes the wire cutter jaw 97 about the wire 12 at a point along the stripped end section and severs the wire, as shown in FIG. 6.

Referring now to FIG. 1, the position of the stop block 123, the air valve 109, and the indicator slide 122 along the guide rod 124 may be adjusted to preset the length to which the wire cutter jaws 96 and 97 cut the stripped end section of the wire 12. This length may be read from the position of the indicator slide 122 along a scale 129 which is affixed to the frame 13. An adjustment dial 131 is used to move the stop block 123, the air valve 109, and the indicator slide 122 along the guide bar 124 parallel to the scale 129 to set the indicator slide at the desired length. The stop block 123, the air valve 109, and the indicator slide 122 are then locked into position by a set screw 132.

The position of the indicator slide 122 determines both the spacing between the stop block 123 and the front support plate 118 of the carrier 17 and also that between the plunger 117 extending from the air valve 109 and the front support plate prior to the withdrawal of the carrier. The spacing between the plunger 117 and the front support plate 118, in turn, determines the distance travelled by the withdrawing carrier 17 before the wire cutter jaw 97 is closed, and thereby determines the length to which the stripped end section of the wire 12 is cut.

It will be noted from reference to FIG. 6 that the cutter jaws 96 and 97 have beveled cutting surfaces 133 and 134, respectively, which cooperate in cutting the wire 12. Also, the cutting surface 134 is curved concavely in order to center the wire 12 and to prevent the wire from sliding along the cutting surfaces 133 and 134 as the wire is cut.

Referring now to FIG. 1, there is shown an arrangement of apparatus, including a straight cam 136 affixed to the end of the piston rod 99, a valve 137 fixedly mounted to the carrier 17, a plunger 138 extending from the valve and a cam follower 139 secured to the plunger, for initiating the opening of the wire cutter jaws 96 and 97. After the advancing piston rod 99 pivotally closes the wire cutter jaw 97 to sever the wire 12, as shown in FIG. 6, continued advancement of the piston rod causes the straight cam 136 to engage the cam follower 139 and depress the plunger 138 into the air valve 137.

As shown in FIG. 7, the movement of the plunger 138 into the air valve 137 overcomes the biasing action of a compression spring 141 to set the air valve to connect a pressure feed line 142 to an air line 143. The input from the pressure feed line 142 is then applied over the air line 143 to operate a pilot valve 144 to move the air valve 111 in a leftward direction. The input from the pressure feed line 108, which is applied by the air line 112 to the air valve 111, is thus applied by the air valve 111 over air lines 146 and 147 to operate pilot valves 148 and 149, respectively, to move the cutter actuator valve 104 and the air valve 74 to the right.

The rightward movement of the cutter actuator valve 104 connects the air line 102 to an exhaust line 151 to exhaust the air from the rear of the air cylinder 101. The rightward movement of the air valve 74 connects the air line 77 to an exhaust line 152 to exhaust the air from the rear of air cylinders 23, 48, and 56. The rightward movement of the air valve 74 also connects the pressure feed line 76 to an air line 153 to apply the input from the pressure feed line to the front of the air cylinders 23, 48, 56, and 101. The piston rod 22 and the slide 21, and the piston rods 53, 57 and 99 are retracted by this input and open, respectively, the wire clamping jaws 18 and 19, the heater jaws 33 and 34, the stripper jaws 36 and 37 and the wire cutter jaws 96 and 97, thereby releasing the wire 12.

In the event the cutter control valve 116 has been preset to preclude the closure of the wire cutter jaw 97, the withdrawal of the carrier 17 effects the release of the wire 12. As mentioned previously, with the cutter control lever 119 preset in the "off" position, the cutter control valve 116 prevents the operation of the pilot valve 114 and the rightward movement of the air valve 111. Thus, when the withdrawing carrier 17 depresses the plunger 117 to actuate the air valve 109, the input from the pressure feed line 108 is applied by the air valve 111 to the air line 147. This input then operates the pilot valve 149 to set the air valve 74 to open the wire clamping jaws 18 and 19, the heater jaws 33 and 34 and the stripper jaws 36 and 37. As mentioned previously, immediately subsequent to the depression of the plunger 117, the stop block 123 is engaged by the front support plate 118 of the carrier 17, thereby stopping the withdrawal of the carrier 17.

Referring now to FIGS. 1 and 2, there is shown an air valve 154 which, upon the release of the wire 12, initiates the return of the carrier 17 to its initial position. The air valve 154 is mounted on the frame 13 beneath the slide 21. A lever 156 which carries a cam follower 157 at one end, is pivotally mounted at the other end to the air valve 154. The lever 156 is normally pivoted away from the air valve 154 by a plunger 158 which is biased outwardly from the air valve by a compression spring 159 (FIG. 7).

When the slide 21 is retracted to open the wire clamping jaws 18 and 19, the slide engages the cam follower 157 and pivots the lever 156, thereby depressing the plunger 158 into the air valve 154. As shown in FIG. 7, the movement of the plunger 158 into the air valve 154 overcomes the biasing action of the compression spring 159 to set the air valve to connect a pressure feed line 161 to an air line 162. The input from the pressure feed line 161 is then applied over the air line 162 to operate a pilot valve 163 to move the air valve 82 to the right. The air valve 82 now connects the pressure feed line 89 to the air line 93 and connects the air line 92 to the exhaust line 91. These connections reverse the previous flow of air into and out of the air cylinder 25, ao that the air cylinder advances the piston rod 20 and the carrier 17 into position for another cycle of operation.

To summarize a cycle of operation of the wire stripper device 10, and referring first to FIG. 1, the wire stop 24 is preset to determine the length of wire 12 which can be inserted into the device and, thus, the length of insulation 11 which can be stripped from the end of the wire. Also, the indicator slide 122 is preset relative to the scale 129 to determine the position at which the stop block 123 will stop the withdrawal of the carrier 17 and to determine the length to which the stripped end section of the wire 12 is to be cut. In addition, the cutter control lever 119 (FIG. 7) is set in the "on" or the "off" position to either allow or preclude the operation of the wire cutter jaws 96 (FIG. 2) and 97. If the operation of the wire cutter jaws 96 and 97 is precluded, the position of the wire stop 24 will determine the length of the stripped end section of the wire 12. In this case, the indicator slide 122 is positioned a short distance beyond the forward end of the wire 12 to insure removing all the insulation 11 form the forward portion thereof.

Referring to FIG. 2, an operator inserts an insulated wire 12 into the wire stripper device 10 (FIG. 1) until the forward end of the wire abuts the wire stop 24, and then moves the wire downwardly to depress the actuator lever 32 and close the switch 31. Upon being closed, the switch 31 initiates the closure of the wire clamping jaws 18 and 19 about a trailing portion of the insulated wire 12 to firmly grip the wire in position. The closure of the switch 31 also initiates the pivotal movement of the stripper lever 41 (FIG. 1) to move the stripper jaw 37 toward the stripper jaw 36 to firmly grip the insulated wire 12 at a point along an intermediate portion thereof. Finally, the closure of the switch 31 initiates the pivotal movement of the heater lever 39 (FIG. 1) to move the heater jaw 34 toward the heater jaw 33.

Assuming that the air cylinder 56 (FIG. 1) has been preset for a gauge pressure which is appropriately greater than that for the air cylinder 48 (FIG. 1), the cooperation among the air cylinders, the heater lever 39 (FIG. 1) and the stripper lever 41 (FIG. 1) prevents the heater jaws 33 and 34 from forceably engaging the insulated wire 12. That is, the force exerted by the piston 57 (FIG. 1) against the stripper lever 41 creates an oppositely directed reactive force which is applied by the air cylinder 56 against the heater lever 39 to oppose the pivotal movement of the heater lever and cause the heater jaws 33 and 34 to be positioned proximate to the periphery of the insulated wire along the intermediate portion thereof. Thus, the heating elements 46 and 47 and the insulated wire 12 are protected from damage which could result from a forceable engagement therebetween.

The pneumatic time delay 68 (FIG. 7) provides a sufficient time interval between the closure of the switch 31 and the closure of the various jaws to allow the operator to insert additional wires 12 into the wire stripper device 10 (FIG. 1). Then, upon the positioning of the heater jaws 33 and 34, the heating elements 46 and 47 thermally sever the wire insulation 11, as shown in FIG. 4.

Referring to FIG. 7, the lever 80 is pivoted by the pivoting heater lever 39 to depress the plunger 83 and apply input from the pressure feed line 86 to the pneumatic time delay device 79. After a predetermined time delay sufficient to effect the severing of the insulation 11, the pneumatic time delay device 79 applies the air input to the pilot valve 81 to initiate the retraction of the piston 20 and thereby withdraw the carrier 17 from the wire clamping jaws 18 and 19, as shown in FIG. 5.

The withdrawing carrier 17 moves the closed stripper jaws 36 and 37 along the wire 12 to strip the insulation 11 from the forward portion of the wire. The withdrawing carrier 17 also moves the heater jaws 33 and 34 along the wire 12. However, because the heater jaws 33 and 34 are prevented from forceably engaging the wire 12, the pulling stress will be applied to the stripper jaws 36 and 37 rather than to the relatively fragile heating elements 46 and 47.

Referring now to FIG. 7, the continued withdrawal of the carrier 17 causes the front support plate 118 to engage and depress the plunger 117, thereby setting air valve 109 to the right and applying the input from the pressure feed line 108 to the air valve 111. Subsequent to the depression of the plunger 117, the front support plate 118 engages the stop block 123 (FIG. 1), thereby terminating the withdrawal of the carrier 17.

If the cutter control lever 119 has been set in the "off" position, the air valve 111 will have remained positioned to the left and will apply the input from the pressure feed line 108 to the pilot valve 149. The operation of the pilot valve 149 then sets the air valve 74 to the right, to initiate the opening of the wire clamping jaws 18 (FIG. 1) and 19, the heater jaws 33 (FIG. 1) and 34 and the stripper jaws 36 (FIG. 1) and 37. If the cutter control lever 119 has been set in the "on" position, the impulse from the impulse valve 69 will have operated the pilot valve 114 to set the air valve 111 to the right. As a result, the input from the pressure feed line 108 will be applied through the air valve 111 to the pilot valve 103 to initiate the closing of the wire cutter jaw 97. The cooperating wire cutter jaws 96 and 97 then cut the wire 12 at a point along the stripped end section, as shown in FIG. 6. Subsequently, the straight cam 136 carried by the wire cutter jaw 97 engages the cam follower 139 and moves the cam follower to the right, as shown in FIG. 7, to depress the plunger 138. Upon being depressed, the plunger 138 sets the air valve 137 to the right, causing the pilot valve 144 to set the air valve 111 to the left to initiate the opening of the wire clamping jaws 18 and 19, the heater jaws 33 and 34, the stripper jaws 36 and 37 and the wire cutter jaws 96 and 97.

Finally, in opening the wire clamping jaws 18 and 19, the slide 21 moves to the left, as viewed in FIG. 2, and pivots the lever 156, thereby depressing the plunger 158. As shown in FIG. 7, depression of the plunger 158 sets the air valve 154 to the right to initiate the application of air from the pressure feed line 89 to the rear of the air cylinder 25. The piston 20 is then advanced to return the carrier 17 into position for the start of another cycle of operation of the wire stripper device 10 (FIG. 1).

The principles embodied in the above-identified wire stripper device 10 are adaptable to other designs as well. As examples, each of the heater jaws 33 and 34 and the stripper jaws 36 and 37 might be pivotally mounted; the combined electrical and pneumatic control circuit 60 might be replaced by an electrical or a pneumatic circuit or by various combinations of electrical and pneumatic circuits; and, operation of the wire stripper device 10 might be initiated by an operator-controlled switch, rather than by the automatically-operated switch 31.

What is claimed is:

1. A device for stripping the insulation from an insulated wire positioned therein, comprising:

a frame;

severing means movably mounted on said frame and actuated upon the positioning of the insulated wire for closing about the wire to sever the insulation thereon;

means mounted on said frame for gripping the insulated wire;

means mounted on said frame and cooperating with said severing means and said gripping means for (1) moving said gripping means into gripping engagement with the insulated wire and for (2) opposing the closing movement of said severing means to prevent forceable engagement between said closed severing means and the insulated wire and prevent damage to said severing means and the insulated wire; and means actuated upon the severing of the insulation for moving said gripping means along the wire to strip the severed insulation from a portion of the wire.

2. In a device for stripping the insulation from an insulated wire as recited in claim 1, further comprising:

means mounted on said frame and actuated upon a predetermined extent of movement of said gripping means along the wire for severing the wire at a predetermined point along the stripped portion thereof.

3. In a wire stripper device, which comprises:

a frame;

means mounted on said frame for securing a length of insulated wire in position for a wire stripping operation;

insulation severing means mounted on said frame for movement toward the insulated wire;

a first force applying means mounted on said frame for applying a force to said insulation severing means to close said insulation severing means about the insulated wire, whereupon said insulation severing means severs the insulation on the insulated wire;

gripping means movably mounted on said frame;

a second force applying means for applying a force to said gripping means to move said gripping means into gripping engagement with the insulated wire;

means mounting said second force applying means to said frame for cooperation with said insulation severing means so that the direction of application of the force applied to said gripping means by said second force applying means is such that a resulting reactive force is applied in opposition to, and decreases the force applied to said insulation severing means by, said first force applying means, thereby precluding forceably engagement between said insulation severing means and the insulated wire and preventing damage to said insulation severing means and the insulated wire; and means mounted on said frame and activated upon the severing of the insulation on the insulated wire for moving said gripping means along the wire to strip the insulation from the wire.

4. In the wire stripping device as recited in claim 3, wherein said wire securing means includes:

means for adjustably positioning an intermediate portion and a forward portion of the insulated wire relative to said insulation severing means and said gripping means such that the insulation is severed at a predetermined point along the intermediate portion of the wire and the movement of said gripping means along the wire strips a predetermined length of insulation from the forward portion of the wire; and means activated upon the positioning of the insulated wire for clamping a trailing portion of the positioned wire to maintain the position of the wire.

5. In the wire stripping device as recited in claim 4, which further includes:

wire severing means movably mounted to said frame and activated upon a predetermined extent of movement of said gripping means along the insulated wire for severing the wire at a predetermined point along the stripped forward portion thereof.

6. In a wire stripper device as set forth in claim 3, wherein said means for moving said gripping means along the wire includes:

a carrier mounting said gripping means thereon and mounted on said frame for reciprocal movement relative to said wire securing means; and means activated upon the severing of the insulation on the insulated wire for moving said carrier away from said wire securing means to move said closed gripping means along the wire and strip the insulation therefrom.

7. In a wire stripper device as set forth in claim 6, wherein:

said insulation severing means includes a pair of spatially opposed severing members and a first lever pivotally mounted on said carrier, a first of said pair of severing members being mounted to a first end of said first lever for movement toward the other of said pair of severing members;

said first force applying means is mounted on said carrier for applying a force against the second end of said first lever;

said gripping means includes a pair of spatially opposed gripping members and a second lever pivotally mounted on said carrier substantially parallel to said first lever, a first of said pair of gripping members being mounted to a first end of said second lever for movement toward the other of said pair of gripping members; and said second force applying means is mounted between the second ends of said first and second levers such that the reactive force resulting from the force exerted by said second force applying means against the second end of said second lever is applied against the second end of said first lever and in opposition to the force applied thereto by said first force applying means.

8. In a wire stripper device, which comprises:

a frame;

a pair of heating members mounted on said frame for movement relative to each other;

a pair of gripping members mounted on said frame for movement relative to each other;

means mounted on said frame for clamping a trailing portion of an insulated wire with an intermediate portion being positioned between both said heating members and said gripping members and a forward portion extending beyond said gripping members;

means mounted on said frame for exerting a force against at least a first of said pair of heating members to move said first heating member toward the other of said pair of heating members so that said pair of heating members sever the insulation at a point along the intermediate portion of the insulated wire;

means for exerting a force against at least a first of said pair of gripping members to move said first gripping member toward the other of said pair of gripping members so that said pair of gripping members close about and grippingly engage the intermediate portion of the insulated wire;

means mounting said gripping member moving means for cooperation with said first heating member and said first gripping member such that the direction of the force applied against said first gripping member causes a resulting reactive force to be applied in opposition to the force applied against said first heating member by said heating member moving means to position said pair of heating members adjacent the periphery of the insulated wire; and means for moving said pair of gripping members along the wire to strip the severed insulation from the forward portion thereof.

9. In a wire stripper device as set forth in claim 8, wherein said means for moving said gripping members along the wire includes:

a carrier mounting said gripping members thereon and mounted on said frame for reciprocal movement relative to said clamping means; and means activated upon the severing of the insulation on the insulated wire for moving said carrier away from said clamping means to move said closed gripping members along the wire and strip the severed insulation from the forward portion thereof.

10. In a wire stripper device as recited in claim 9, further comprising:

an adjustable wire stop mounted on said carrier for presetting the length of the forward portion of the wire which extends beyond said gripping members.

11. In a wire stripper device as recited in claim 9, further comprising:

a pair of cutting members mounted on said carrier for movement relative to one another; and cutter actuator means mounted on said carrier and actuated upon a predetermined extent of movement of said closed gripping members along the wire for moving said cutting members to engage and sever the wire at a predetermined point along the stripped forward portion thereof.

12. In a wire stripper device as set forth in claim 9, further including:

at least a pair of levers pivotally mounted on said carrier in a substantially parallel arrangement;

a first of said pair of heating members being mounted to a first end of a first one of said pair of heating members;

said first heating member moving means being mounted on said carrier for applying a force against the second end of said first lever;

a first of said pair of gripping members being mounted to a first end of the second of said pair of levers for movement toward the other of said pair of gripping members; and said first gripping member moving means being mounted between the second ends of said first and second levers such that the reactive force resulting from the force exerted by said first gripping member moving means against the second end of said second lever is applied against the second end of said first lever and in opposition to the force applied thereto by said first heating member moving means.

13. In a wire stripper device, which comprises:
a frame;
a carrier movably mounted on said frame;
a pair of levers pivotally mounted on said carrier in a substantially parallel arrangement;
a pair of spatially opposed, cooperating heating members, a first of said pair of heating members being mounted to said carrier and the second of said pair of heating members being mounted at a first end of a first one of said pair of levers for pivotal movement toward said first heating member;
a pair of spatially opposed, cooperating gripping members, a first of said pair of gripping members being mounted to said carrier and the second of said pair of gripping members being mounted at a first end of the second one of said pair of levers for pivotal movement toward said first gripping member;
a pair of cooperating clamping members mounted to said frame for movement toward each other;
means mounted to said frame for moving said pair of clamping members toward each other to clamp a trailing portion of an insulated wire with an intermediate portion being positioned between said pair of heating members and said pair of gripping members and with a forward portion extending beyond said gripping members;
first force applying means mounted on said carrier for applying a force to the second end of said first lever to pivot said first lever to move said second heating member toward said first heating member and thereby close said pair of heating members about the intermediate portion of the insulated wire and sever the insulation thereon;
second force applying means for applying a force to the second end of said second lever to pivot said second lever to move said pair of gripping members into gripping engagement with the intermediate portion of the insulated wire;
means mounting said second force applying means between the second ends of said first and second levers such that the direction of application of the force applied by said second force applying means applies a resulting reactive force in opposition to the pivotal closing movement of said first lever to prevent said pair of heating elements from forceably engaging the insulated wire and thereby prevent damage to said pair of heating elements and the insulated wire; and
means mounted on said carrier and actuated upon the severing of the insulation for moving said carrier longitudinally relative to the wire and away from said clamping members to impart like movement to said pair of gripping members and thereby strip the severed insulation from the forward portion of the wire.

14. In a wire stripper device as recited in claim 13, further comprising:
an adjustable wire stop mounted on said carrier for presetting the length of the forward portion of the wire which extends beyond said gripping members.

15. In a wire stripper device as recited in claim 14, further comprising:
a pair of cutting members mounted on said carrier for movement relative to one another; and
cutter actuator means mounted on said carrier and actuated upon a predetermined extent of movement of said gripping members along the wire for moving said cutting members to engage and sever the wire at a predetermined point along the stripped forward portion thereof.

* * * * *